(12) United States Patent
Hoch

(10) Patent No.: US 6,492,963 B1
(45) Date of Patent: Dec. 10, 2002

(54) ELECTRONIC DISPLAY APPARATUS

(75) Inventor: David J. Hoch, Watertown, MA (US)

(73) Assignee: Illumination Design Works, Watertown, MA (US)

( * ) Notice: Subject to any disclaimer, the term of this patent is extended or adjusted under 35 U.S.C. 154(b) by 0 days.

(21) Appl. No.: 09/295,891

(22) Filed: Apr. 21, 1999

Related U.S. Application Data

(60) Provisional application No. 60/111,326, filed on Dec. 7, 1998.

(51) Int. Cl.$^7$ .................................................. G09G 3/14
(52) U.S. Cl. ........................... 345/39; 345/31; 345/55; 345/56; 340/432; 340/815.45; 362/72
(58) Field of Search ................................ 345/55–57, 31, 345/39; 340/815.73, 815.83, 815.86, 815.45, 815.53, 815.54, 815.55, 815.62, 815.64, 427, 432; 362/72

(56) References Cited

U.S. PATENT DOCUMENTS

| | | | | |
|---|---|---|---|---|
| 4,470,044 A | * | 9/1984 | Bell | 345/31 |
| 4,631,848 A | * | 12/1986 | Isawa et al. | 40/427 |
| 5,057,827 A | * | 10/1991 | Nobile et al. | 345/31 |
| 5,121,305 A | * | 6/1992 | Deed et al. | 362/193 |
| 5,177,432 A | * | 1/1993 | Waterhouse et al. | 324/166 |
| 5,180,912 A | * | 1/1993 | McEwen et al. | 250/234 |
| 5,192,864 A | * | 3/1993 | McEwen et al. | 250/234 |
| 5,302,965 A | * | 4/1994 | Belcher et al. | 340/815.43 |
| 5,548,300 A | * | 8/1996 | Tokimoto | 340/815.45 |
| 5,667,290 A | * | 9/1997 | Cioletti et al. | 340/432 |
| 5,670,971 A | * | 9/1997 | Tokimoto et al. | 345/31 |
| 5,748,157 A | * | 5/1998 | Eason | 345/31 |
| 5,800,039 A | * | 9/1998 | Lee | 362/473 |
| 5,803,574 A | * | 9/1998 | Szaniszlo | 340/432 |
| 5,903,224 A | * | 5/1999 | Reynolds | 340/815.45 |
| 6,013,958 A | * | 2/2000 | McGaffigan | 385/146 |
| 6,037,876 A | * | 3/2000 | Crouch | 340/815.53 |
| 6,072,386 A | * | 6/2000 | Yu | 340/432 |
| 6,116,762 A | * | 9/2000 | Kutlucinar | 362/226 |
| 6,193,384 B1 | * | 2/2001 | Stein | 362/96 |
| 6,236,785 B1 | * | 5/2001 | Parker et al. | 385/48 |

FOREIGN PATENT DOCUMENTS

WO   PCT/GB97/02230   8/1997

* cited by examiner

Primary Examiner—Richard Hjerpe
Assistant Examiner—Henry N. Tran
(74) Attorney, Agent, or Firm—Dirk Brinkman

(57) ABSTRACT

A light display is mounted on the spokes of a rotating bicycle wheel. The display includes a plurality of arrays of lights, each array attached to one of the spokes. A sensor on the wheel, actuated by a magnet mounted on the frame, senses the angular velocity of the rotating wheel with respect to the bicycle frame. A microprocessor, mounted on the wheel and connected to the sensor, and individually connected to each of the plurality of arrays of lights by a cable, includes a memory which stores a plurality of display patterns. The microprocessor modulates the plurality of arrays of light according to a selected one of the plurality of display patterns and the sensed angular velocity of the rotating wheel to form an image using persistence of vision of a viewer.

15 Claims, 17 Drawing Sheets

ELECTRONIC DISPLAY APPARATUS

RELATED APPLICATION

This complete U.S. Patent Application is related to U.S. Provisional Patent Application 60/111,326 "Electronic Display Apparatus" filed by David J. Hoch on Dec. 7, 1998.

FIELD OF THE INVENTION

This invention relates generally to devices for displaying information or images, and more particularly, to a display apparatus for producing an optical illusion of displayed images using time/position multiplexing and persistence of vision of a viewer.

BACKGROUND OF THE INVENTION

The characteristic persistence of vision of human viewers has been used to advantage in previous display devices. The Bell U.S. Pat. No. 4,470,044 uses a modulated array of lights to create momentary perceptible visual images when scanned asynchronously by the human eye. There, the display device relies on saccadic eye movement between two points of eye fixation, the device itself remains stationary.

The Nobile et al. U.S. Pat. No. 5,057,827 describes a motor actuated rotating member where an array of LEDs are turned on and off using time or position division multiplexing so that to an observer an image is generated over the path of the array.

The McEwen et al. U.S. Pat. Nos. 5,180,912 and 5,192,864 describe a linear array of LEDs that also is stationary. There, a rotating mirrored surface or facet of a polygon is used to create the effect of rotary motion of the LED array. The persistence of vision of a human observer produces a two dimensional image as the LEDs are selectively controlled.

The Belcher et al. U.S. Pat. No. 5,302,965 describes a rotating display device which rotates vertical columns of light emitting diodes. The light emitting diodes arranged in the columns sweep around a cylindrical surface. A control circuit turns the light emitting diodes on and off to provide an image display on the surface. The Belcher et al. display device requires a complex electromechanical device with a motor for rotating the LED columns at a uniform rate of rotation.

The Eason U.S. Pat. No. 5,748,157 describes a hand held wand with an LED column actuated by an inertial switch. The wand can be swung back and forth while the lights are periodically turned on and off.

The Tokimoto U.S. Pat. No. 5,548,300 also describes a manually operated wand with an array of LED lights. The wand can be swung around an operating fulcrum. The fulcrum supplies relative angular position information and rotation speed information for synchronizing the turning of the lights.

A disadvantage of traditional persistence of vision display devices is that complex electromechanical devices are required for producing uniform oscillating or rotating. The prior art devices also cannot readily adjust to different and variable periods or cycle times in different uses. The devices with a singular linear array of light are also not suited for slowly moving display systems, or for use in conditions where there is a significant amount of ambient background light.

SUMMARY OF THE INVENTION

A light display is mounted on a bicycle wheel. The display includes a plurality of arrays of lights. The arrays include at least one master array, and a number of additional slave arrays. Each of the arrays is attached to a spoke of the bicycle wheel. A sensor mounted on the wheel is actuated by a magnet mounted on the bicycle frame. The sensor is used to determine the angular velocity of the wheel. The sensor can be attached to a coil of wire where a current is induced when the coil passes through the magnetic field.

A microprocessor, mounted on the wheel and connected to the sensor, and individually connected to each array of lights by a cable, includes a memory which stores a plurality of display patterns. The microprocessor modulates the plurality of arrays of light according to a selected one of the plurality of display patterns and the sensed angular velocity of the rotating wheel to form an image using persistence of vision of a viewer.

As an advantage, the display device with multiple light arrays can be used by rotating objects having a relatively low angular velocity, such as a bicycle wheel. In addition, with multiple reinforcing lights, the device can be used in places where there is a significant level of ambient background light, such as public roads.

DETAILED DESCRIPTION OF THE PREFERRED EMBODIMENTS

Figure 1:
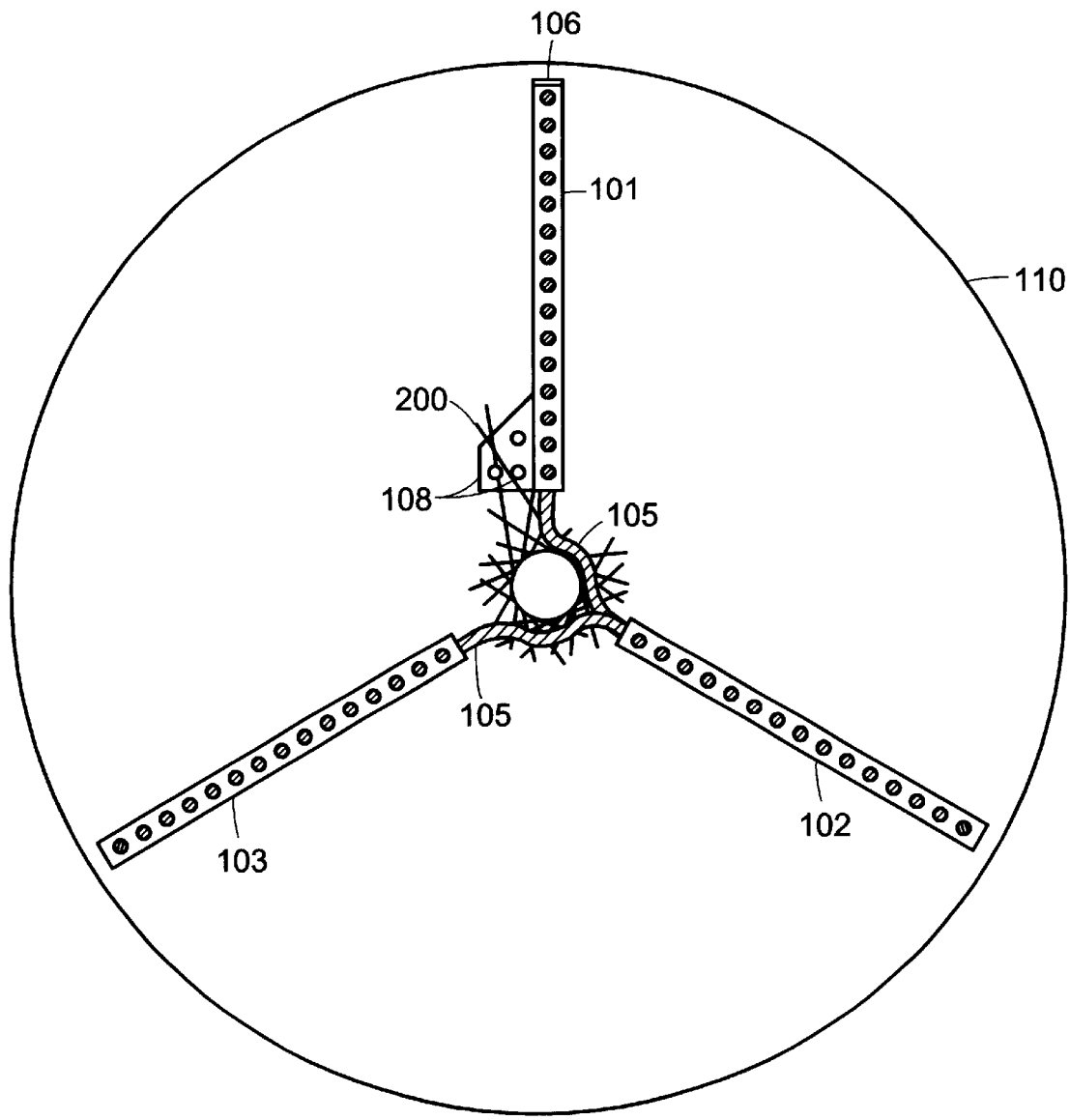
FIG. 1 is a side view of linear arrays of lights mounted on spokes of a bicycle wheel.

As shown in FIG. 1, the apparatus according to my invention comprises one or more linear arrays 101–103 of light-emitting diodes (LEDs), and circuitry 200 to activate the light arrays. The arrays 101–103 and control circuitry 200 are for mounting on spokes of a bicycle wheel 110, either on the front, back, or both wheels. It should be understood that the apparatus can also be arranged on other rotating or oscillating objects.

At least one array 101, and the control circuitry 200 is a "master" array, and the additional arrays 102–103 are "slave" arrays connected to the master by cables 105 for serial communication. Other configurations can include a single master, one master and one slave, one master and two slaves (as shown), one master and three slaves, and so forth. The light arrays are respectively mounted on master and slave housings described in greater detail below. The housings can be used to attach the arrays to moving objects, such as, wheels.

Each array includes, for example, sixteen LEDs. The number of lights can be adjusted for radii of different lengths. The control circuit 200 includes a battery compartment that holds, for example, four batteries and a microprocessor. The end of the master array nearest to the rim of the wheel includes a sensor 106, for example, a coil including about a hundred turns of wire. A current is induced in the coil whenever it passes through a magnetic field. The current can be amplified and detected by the sensor. Alternatively, the sensor can be a reed switch, or a solid-state magnetic-field Hall-effect sensor. The sensor 106 is actuated by a magnet that can be attached to the fork of the bicycle frame. In other words, the magnet is stationary while the arrays and the sensor rotate. The sensor 106 is used to synchronize the operation of the lights as the wheel 110 rotates. The entire apparatus is operated by control buttons 108.

Figure 2:
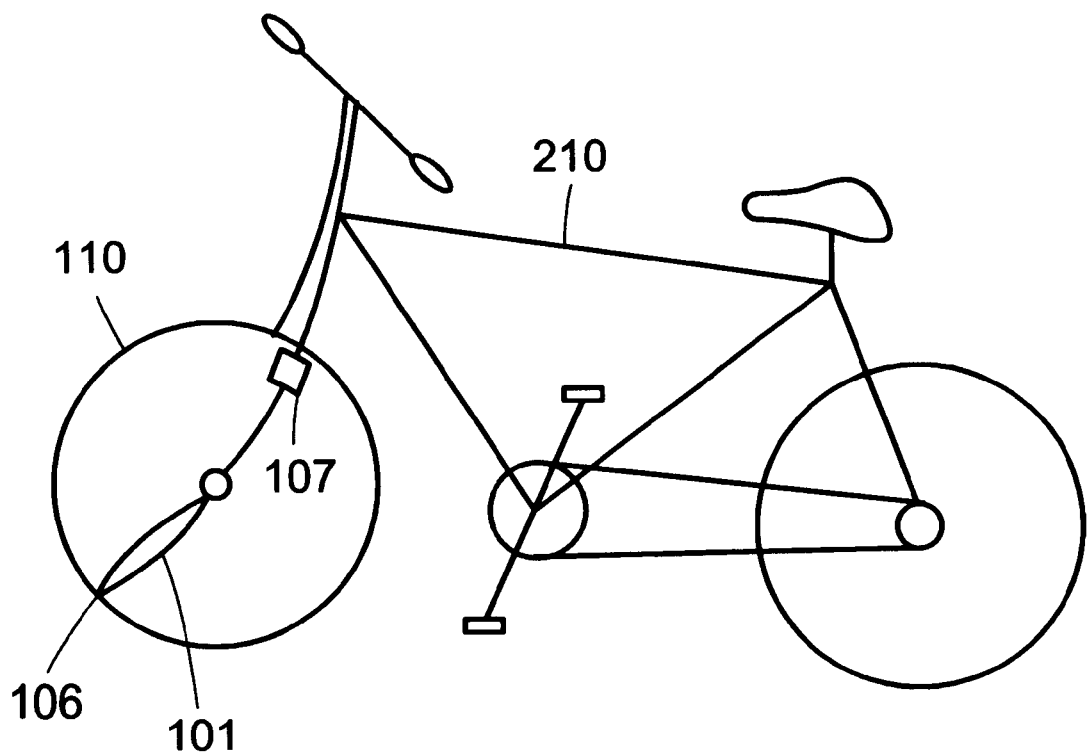
FIG. 2 shows the array of lights mounted on a bicycle.
Figure 3A:
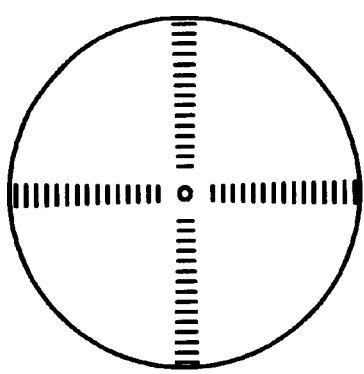
FIGS. 3a–3f show possible light patterns.
Figure 3B:
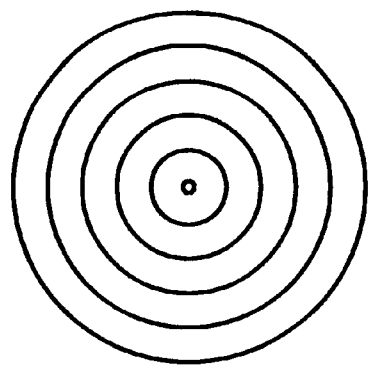
Figure 3C:
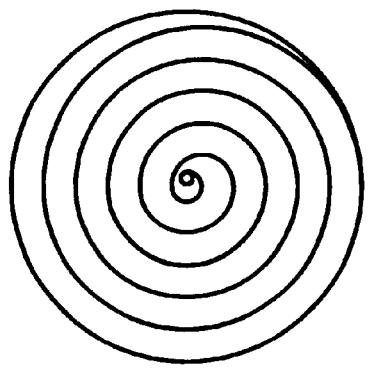
Figure 3D:
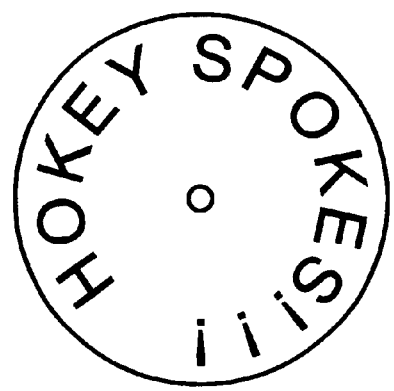
Figure 3E:
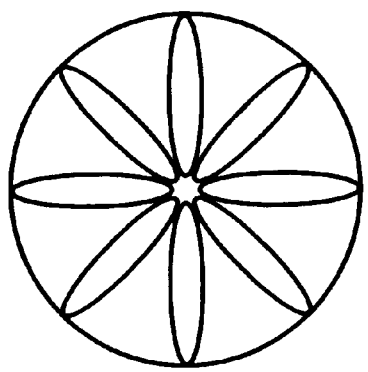
Figure 3F:
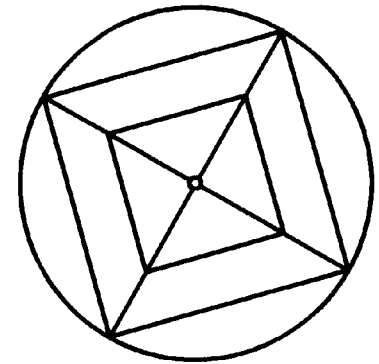

As shown in FIG. 2, when a cyclist rides a bicycle 210 during low-light or night time conditions, the array 101 attached to a spoke rotate as the wheel 110 spins. When the end of an array containing the sensor 106 passes the magnet 107 on the frame, a contact closure is made. In cases where the coil is used, a current is induced, and for a Hall-effect sensor, the magnetic field is interrupted. The frequency of actuation determines the angular velocity of the wheel. With this information, the microprocessor can synchronize images and patterns displayed by the LEDs to the speed of the wheel. This allows images to be "frozen" or controllably "scrolled" in one direction or the other. Because the entire linear array of lights is swept during motion, it appears to the viewer as if the entire wheel is illuminated.

Each array contains a series of LEDs. Each LED is mounted inside a plastic housing that contains a series "light-pipes" that split the light path from the single LED into two light paths, each perpendicular to the rotation of the wheel. This is done so that the images or geometric patterns can be seen from either side of the wheel, using only a single LED. By using only a single LED and splitting the light as such, costs are reduced.

An alternative embodiment eliminates the light pipe and includes two rows of LEDs pre-mounted perpendicular to the rotation of the wheel. This configuration allows different colors to be generated on the left and right sides of the wheel by using two different colored LEDs on each side.

When a single master array 101 is used, the rider must go approximately twenty mph for the light display to appear as solid light to the human eye. At this speed, the brain "merges" the LEDs into a uniform, consistent image. To allow patterns to be viewed at slower rider velocities, additional slave arrays 102–103 can be spaced around the rim. Slave arrays are similar in appearance to the master array but do not contain a microprocessor and other additional circuitry. The slaves are attached to the master using cables 105 and a series of in-line connectors.

The master can determine how many slaves are attached by detecting the presence of a "pull-down-resistor" in the slaves connected to the master by cables 105. This sensing for the number of spokes can be done when power is initially turned on. Depending on how many slave arrays are detected, the internal timings of the microprocessor can be adjusted to generate the appropriate patterns. With a larger number of slaves, the consistency, image quality and persistence to the observer is significantly better, particularly in is lighted areas.

Each slave can also include a battery compartment for additional batteries. Power available from any of the arrays can be combined to operate the apparatus. A configuration including a single master and multiple slaves can continue to operate even when a number of slaves or the master has dead batteries. Only one of the arrays needs to have good batteries, and these good batteries power the entire apparatus.

A memory connected to the microprocessor can store a large number of patterns, images, and messages, for example, hundreds. These images can be played out in a random, sequential, or fixed pattern. Selection of the playback method is done via the pushbutton switches 108 located in the master array, see FIG. 1.

FIGS. 3a–3f show additional possible patterns, for example, spokes, rings, a spiral, letters, petals, and a geometric pattern.

In the usual case, where a number of display devices are used, the display devices should be spaced as close to evenly as possible around the wheel. For bicycles, a number of arrangements for spokes exist. Many wheels have thirty-two spokes, while others have thirty-three. When attaching three display devices on a wheel with 36 spokes, for instance, each display device is placed evenly, each 120 degrees from each other, around the wheel.

When trying to attach three display devices to a 32 spoked wheel, it is impossible using mechanical connections to spokes to evenly distribute the display devices around the wheel. In this case, for a 32 spoked wheel, the display devices could be connected at 0 degrees, 123.75 degrees, and at 247.5 degrees, for example.

When displaying text and other patterns, the microprocessor must know how the display devices are distributed around the wheel. The processor executes timing experiments and adjusts the light patterns based on the separation of the display devices. If the display devices are not evenly spaced around the rim, and the microprocessor does not adjust for this, gaps and overlapping images will occur.

To prevent this, the master display device 101 can be programmed using the control buttons 108 to understand the spoke pattern on the wheel. For instance, the user might enter 32 or 36 or some other number. The user could also specifically indicate the "spoke" spacing between the devices. The microprocessor automatically determines the number of attached display devices using the pull-down resistors, this, together with the device spacing information, is sufficient information to adjust the modulation so that continuous images without gaps or overlapping are generated.

Figure 4A:
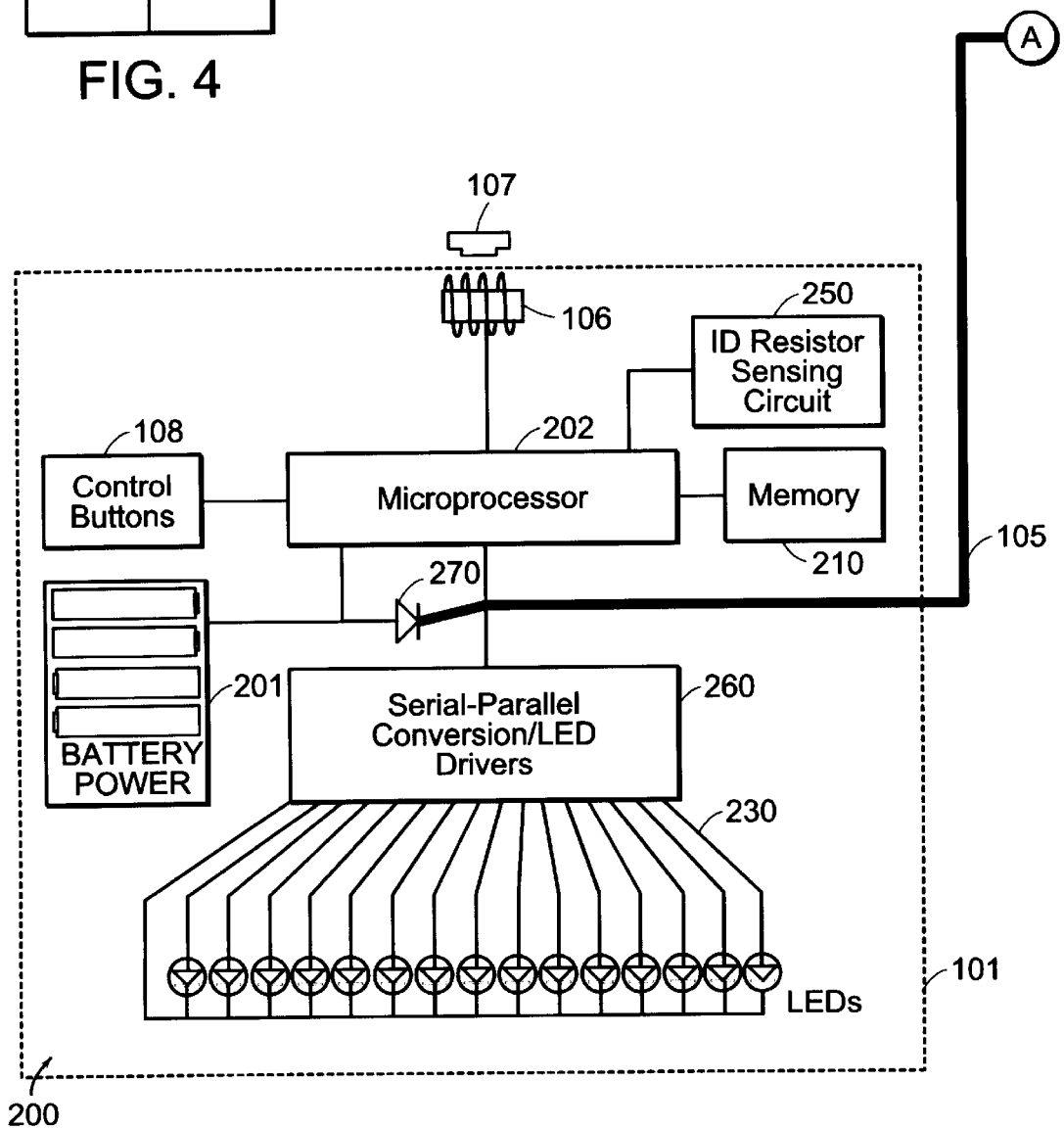
FIG. 4 is a block diagram of master and slave light arrays.
Figure 4B:
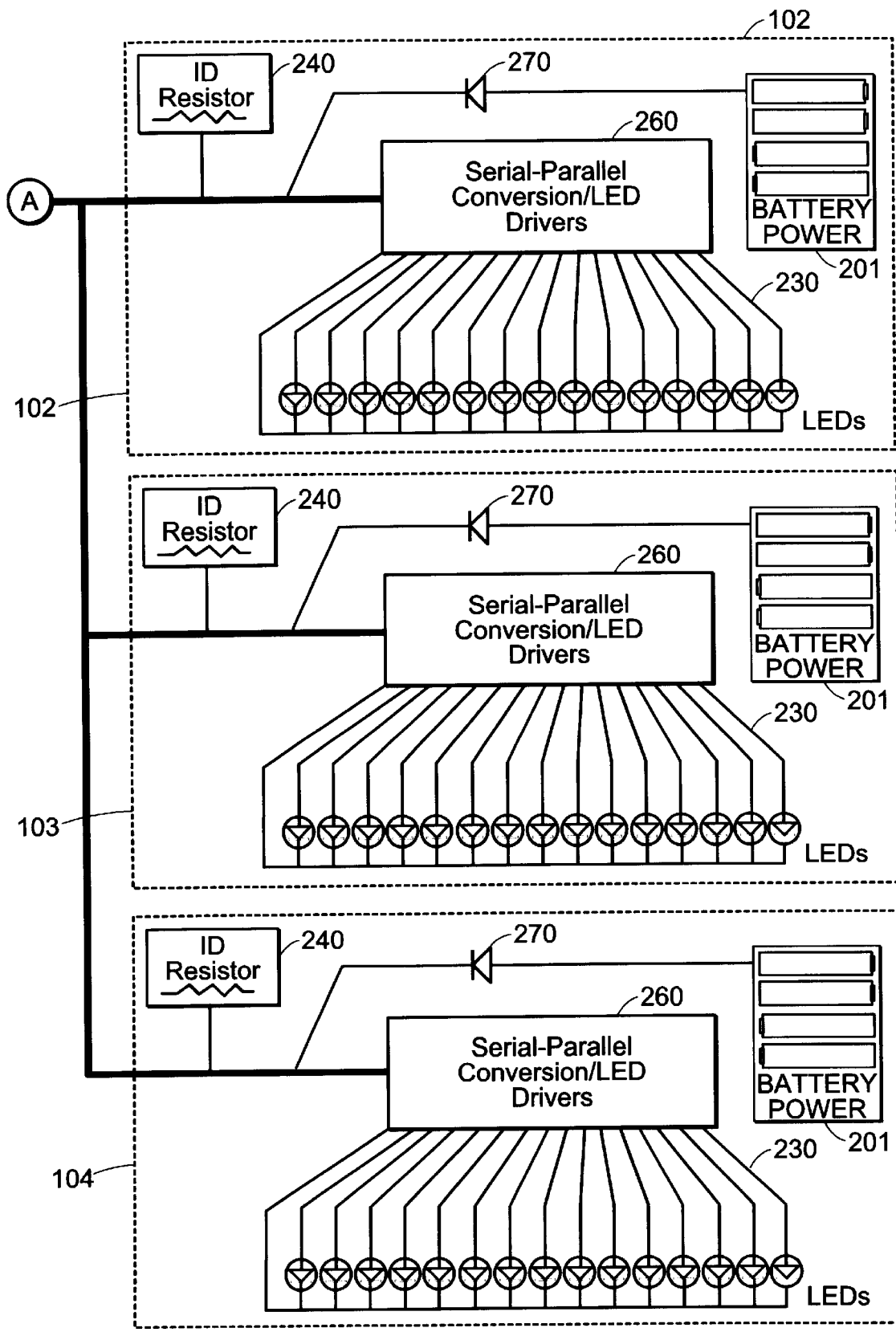

FIG. 4 is a block diagram of the circuitry 200 for one master display device 101 and three slave display devices 102–104. The circuitry includes batteries 201 for powering the microprocessor 202, memory 220, and LEDs 230. The slaves are equipped with programming ID resistors 240. The number of slaves is sensed by sensing circuit 250. The LEDs are activated via series-parallel conversion/LED drivers 260. Power sharing among the master and the slaves is accomplished by battery share diodes 270.

Figures 5, 5A:
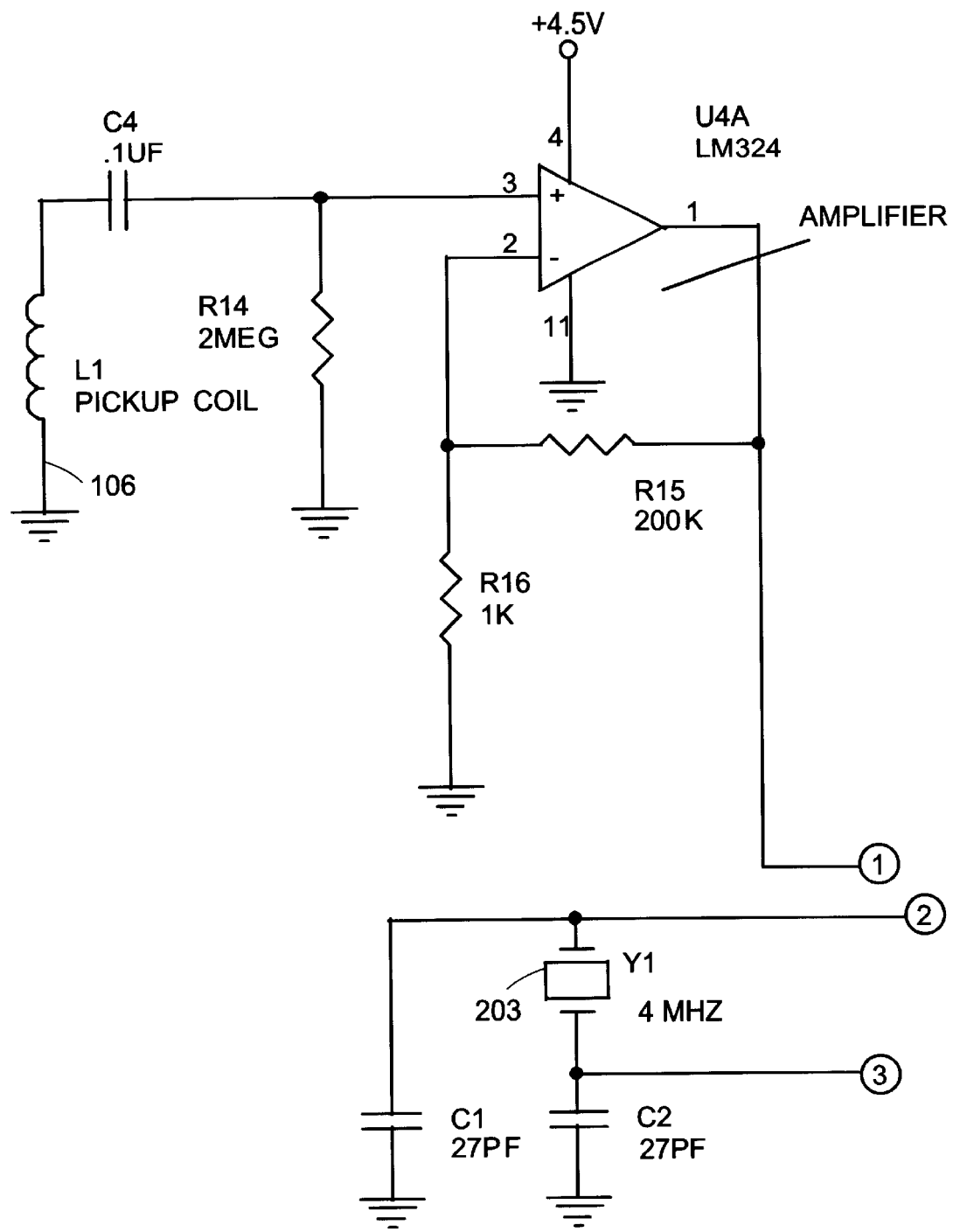
FIG. 5 is a schematic of a master array.
Figure 5B:
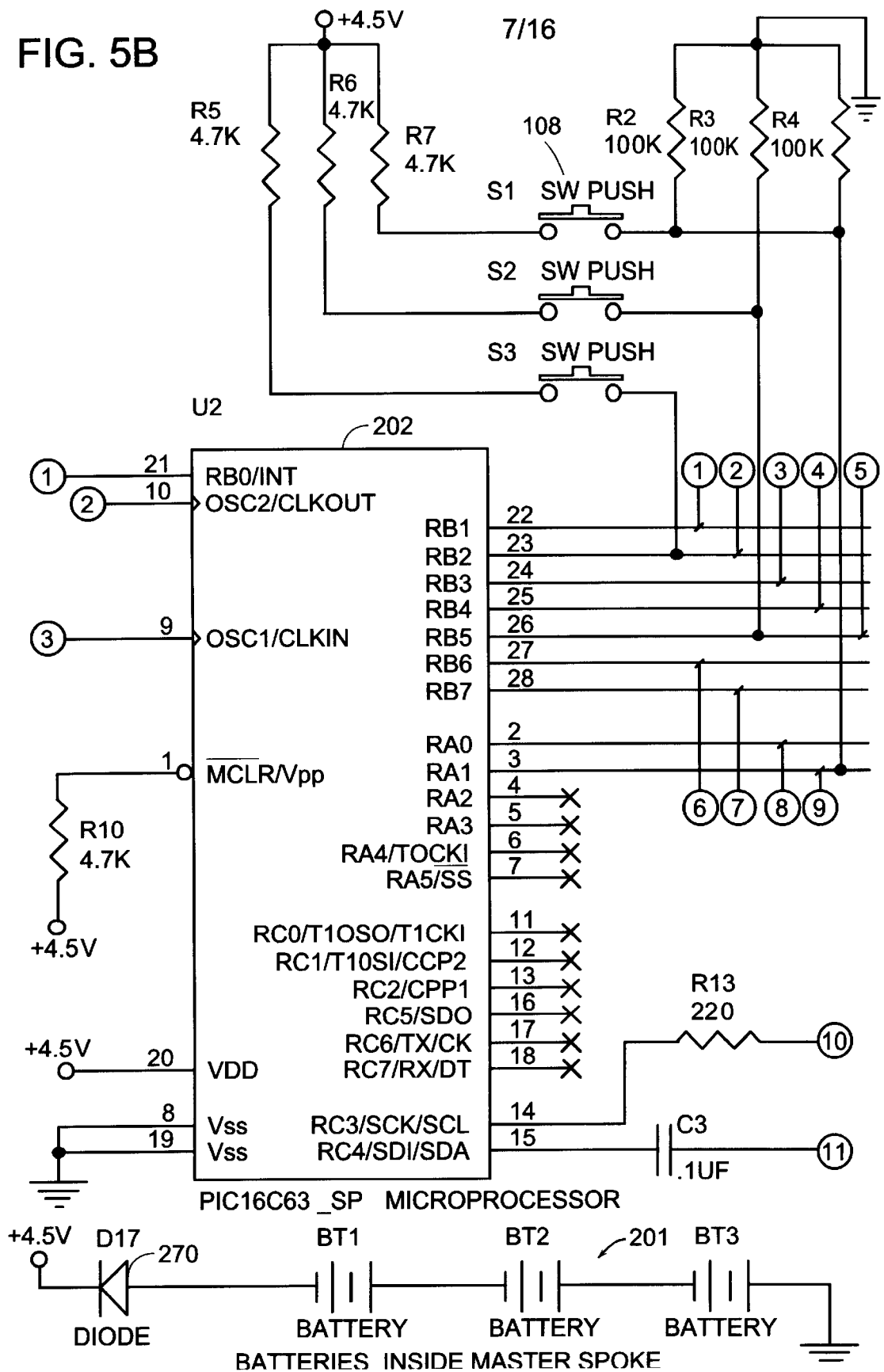
Figure 5C:
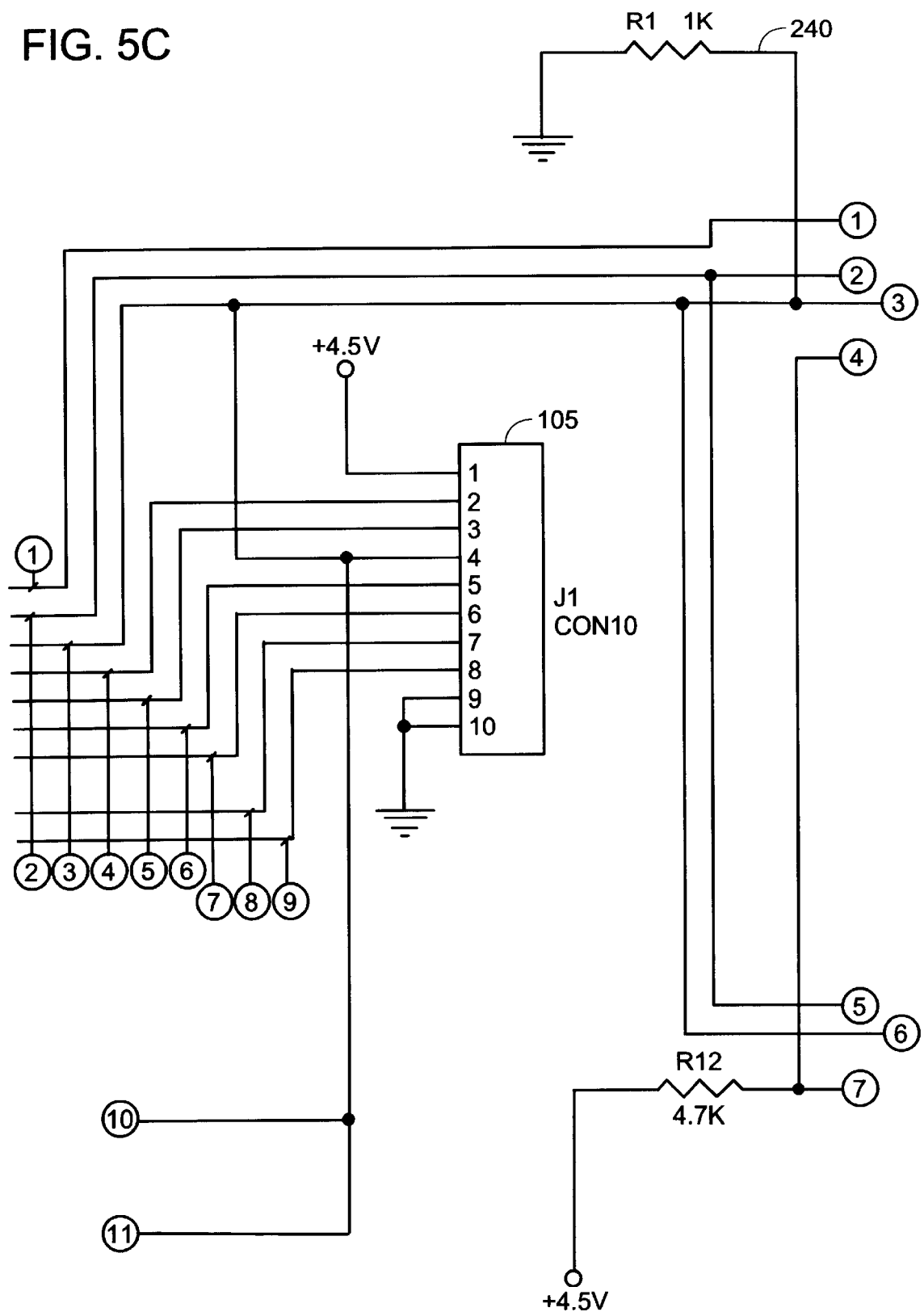
Figure 5D:
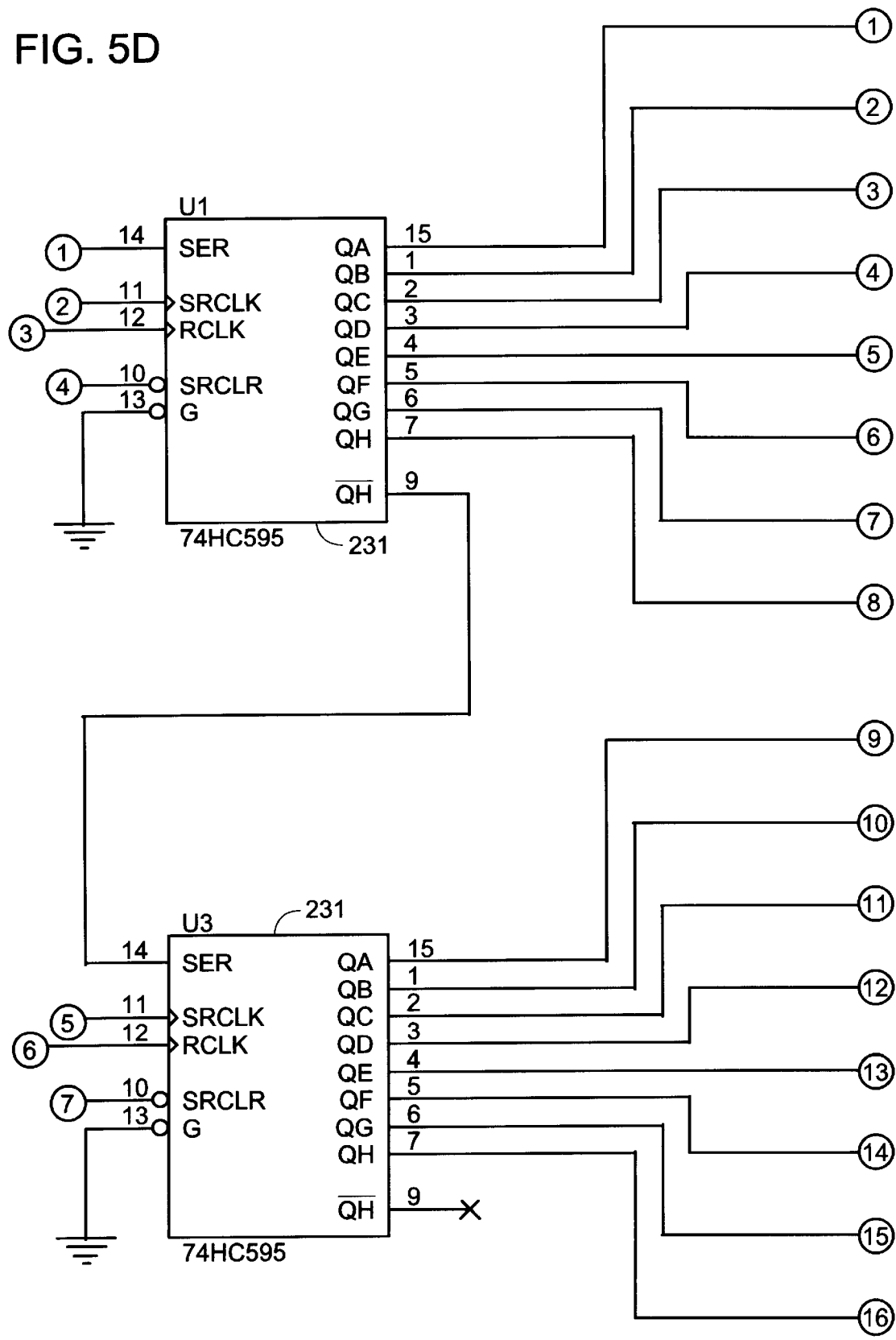
Figure 5E:
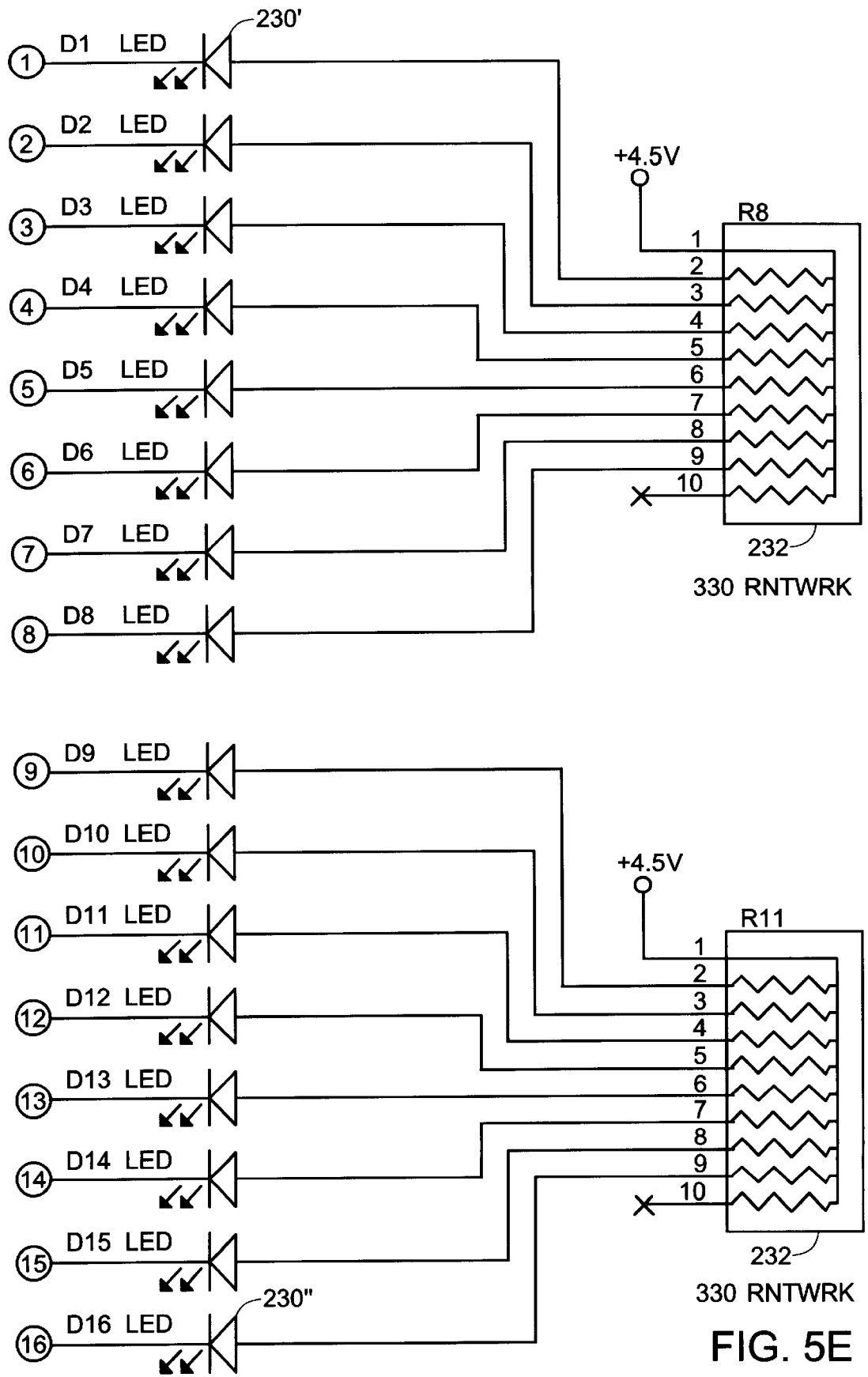

FIG. 5 is a detailed schematic of the control circuit 200 of the master display device 101. The microprocessor 202, e.g., a PIC16C from Microchip Technology Inc., is clocked by a 4 MHz crystal 203. The microprocessor 202 includes memory 220 for storing the possible patterns. As shown, the two banks of eight LEDs 230' and 230" are driven via serial to parallel converters 231, and the LEDs are connected to resistor networks 232.

Figures 6, 6A:
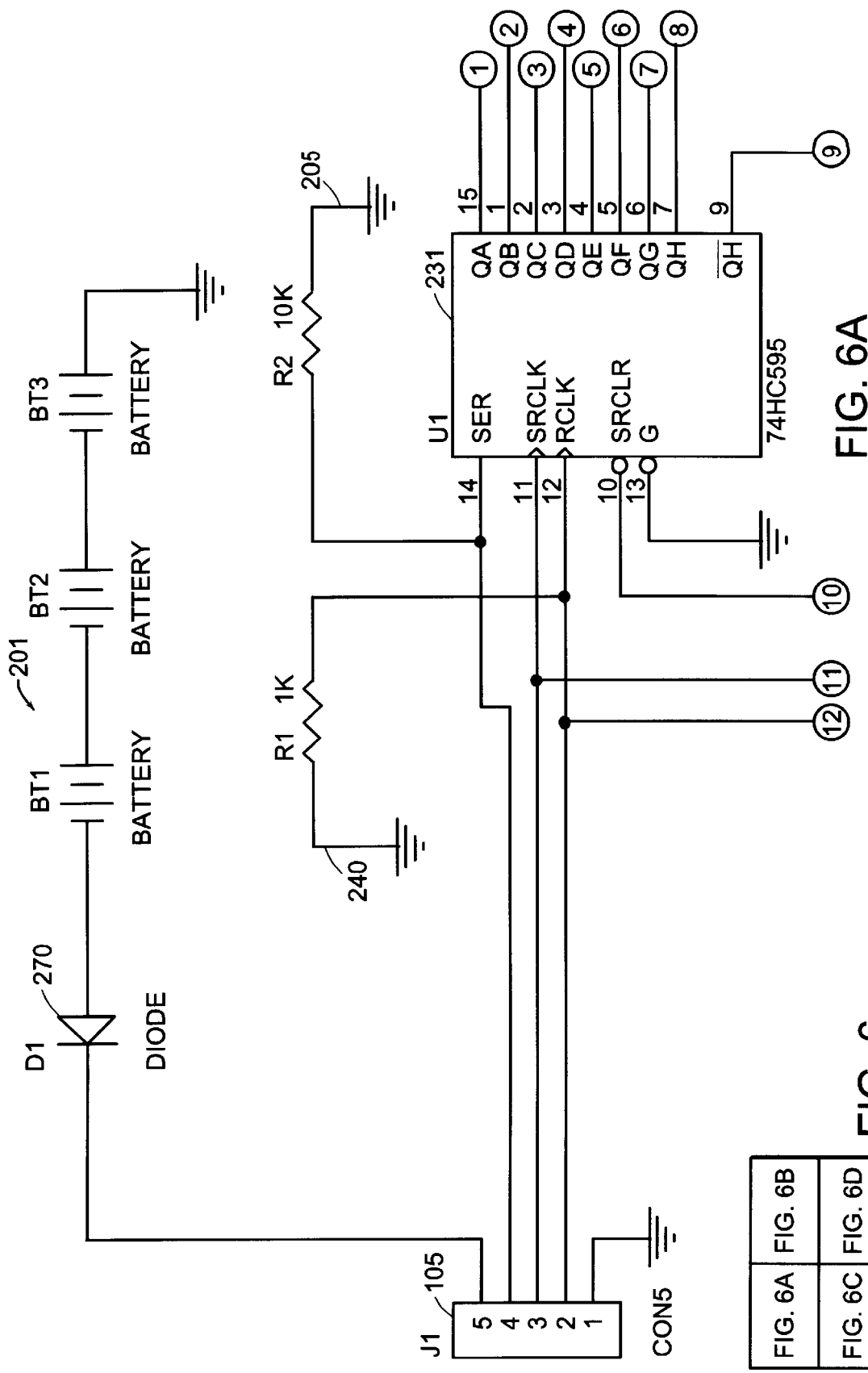
FIG. 6 is a schematic of a slave array.
Figure 6B:
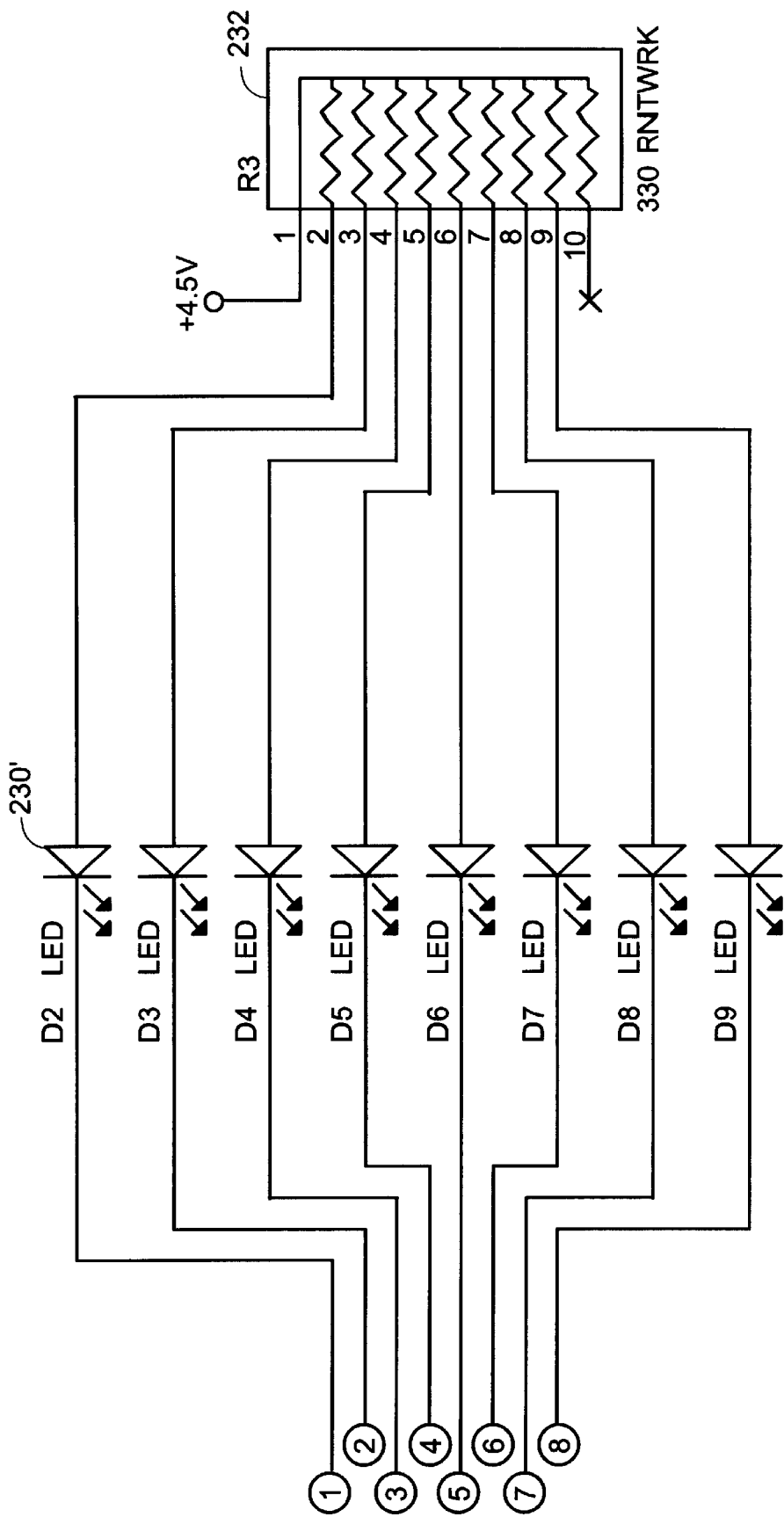
Figure 6C:
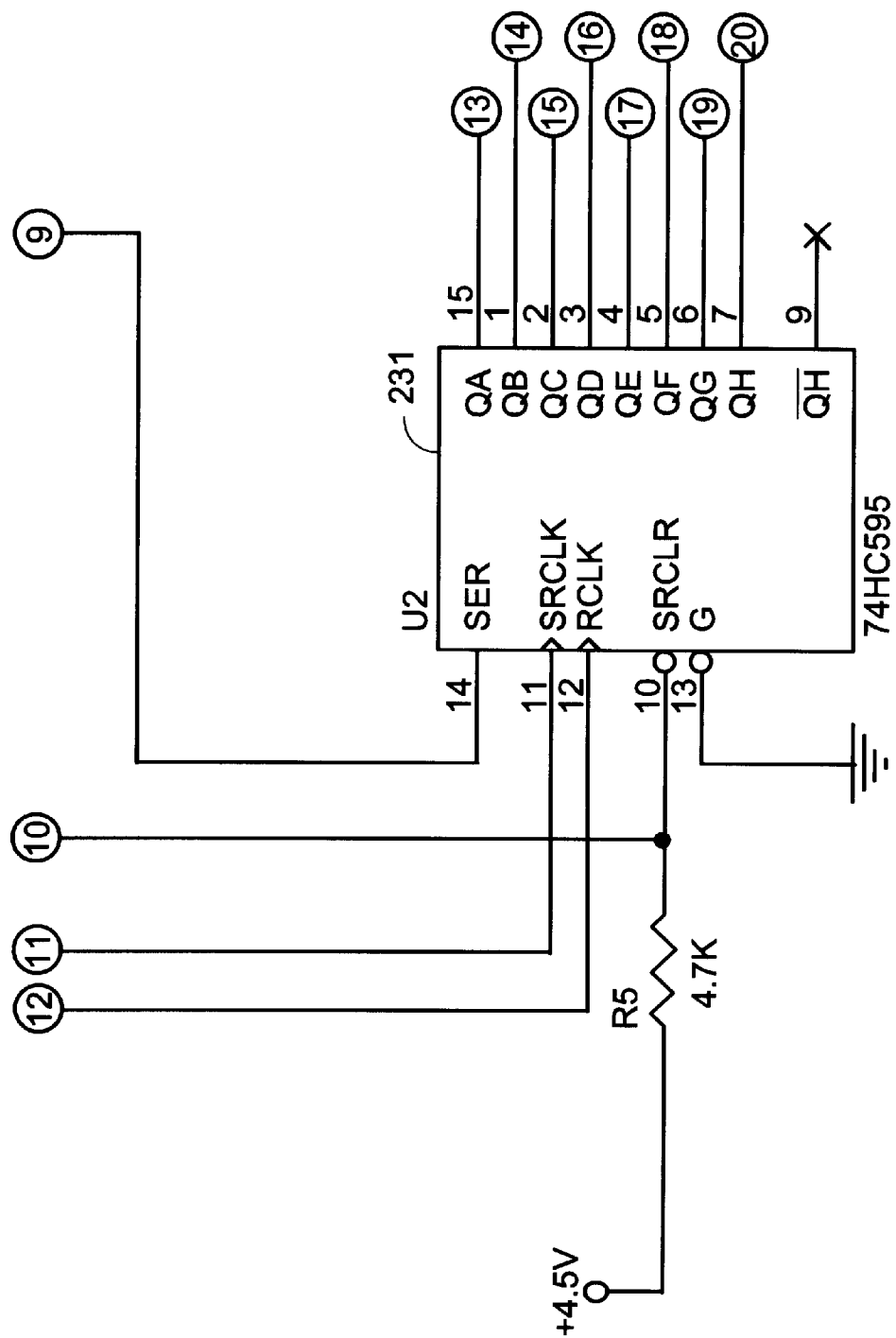
Figure 6D:
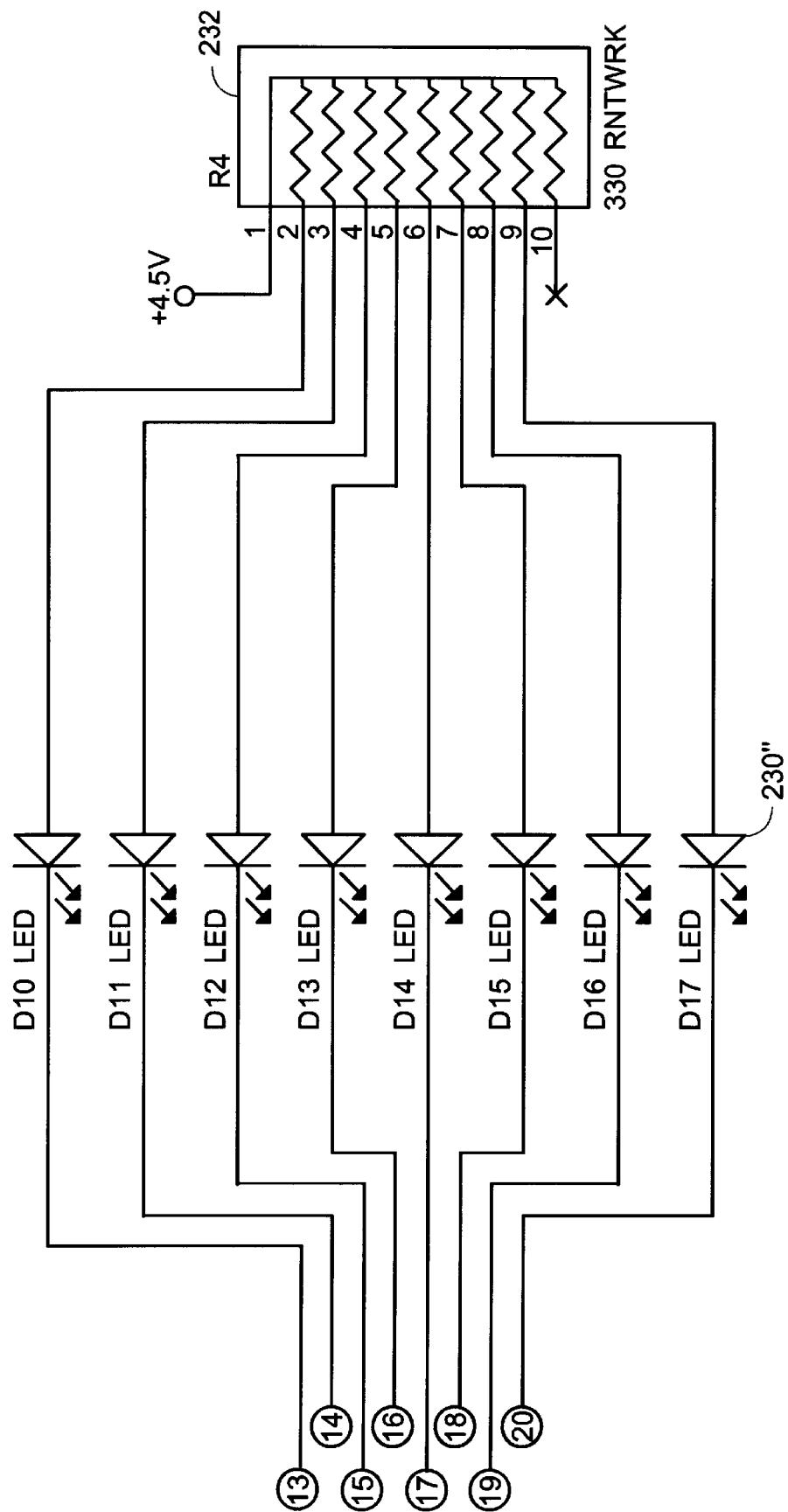

FIG. 6 is a detailed schematic of a slave display device, where resistor 205 is a pull-down resistor for detecting the slave.

Figure 7:
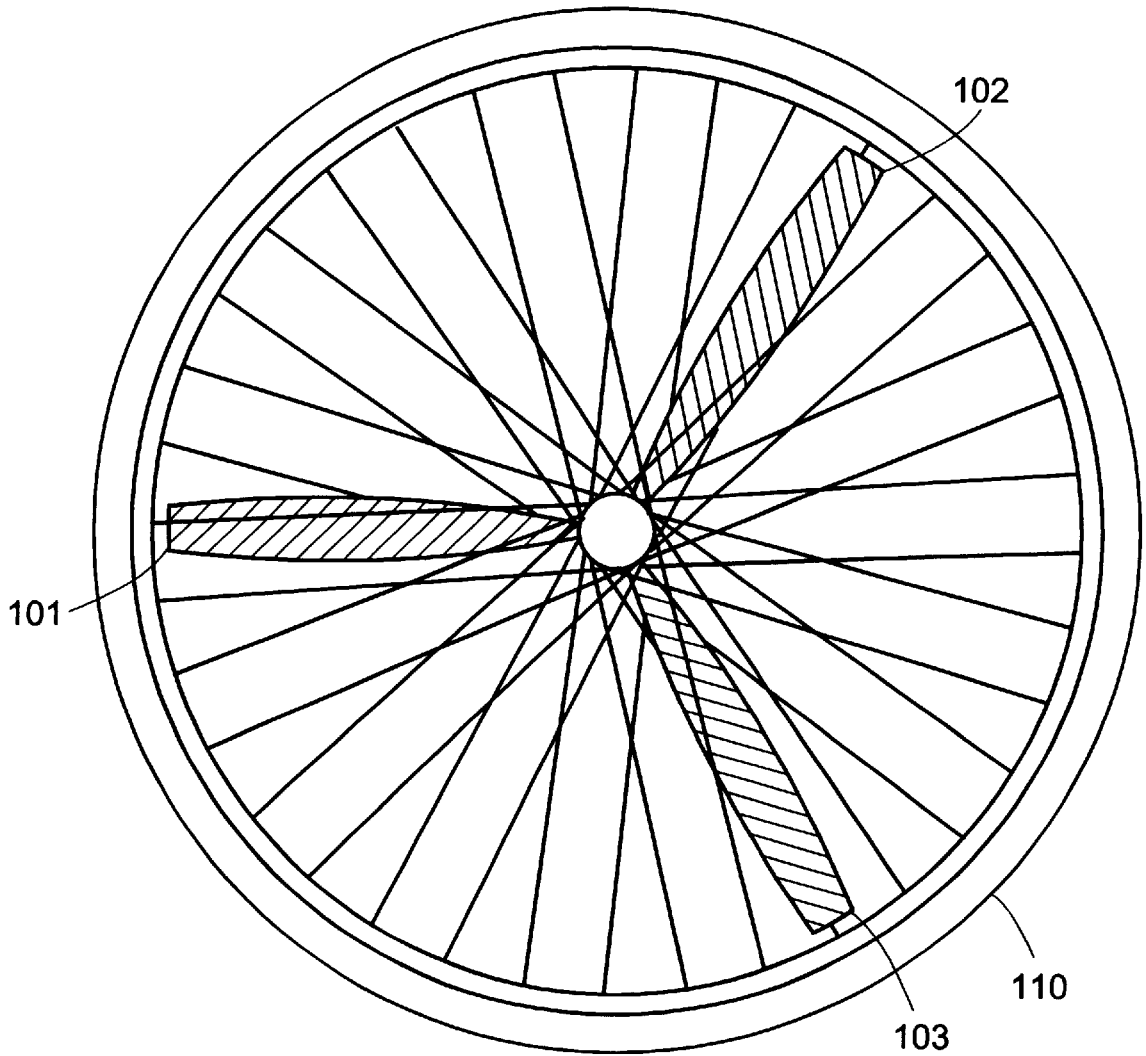
FIG. 7 is a side view of a bicycle wheel with one master and two slave arrays.

FIG. 7 shows the master display device 101 and the two slave display devices 102–103 attached to the bicycle wheel 110. In this configuration, the display devices 101–103 have a propeller shape.

Figure 8:
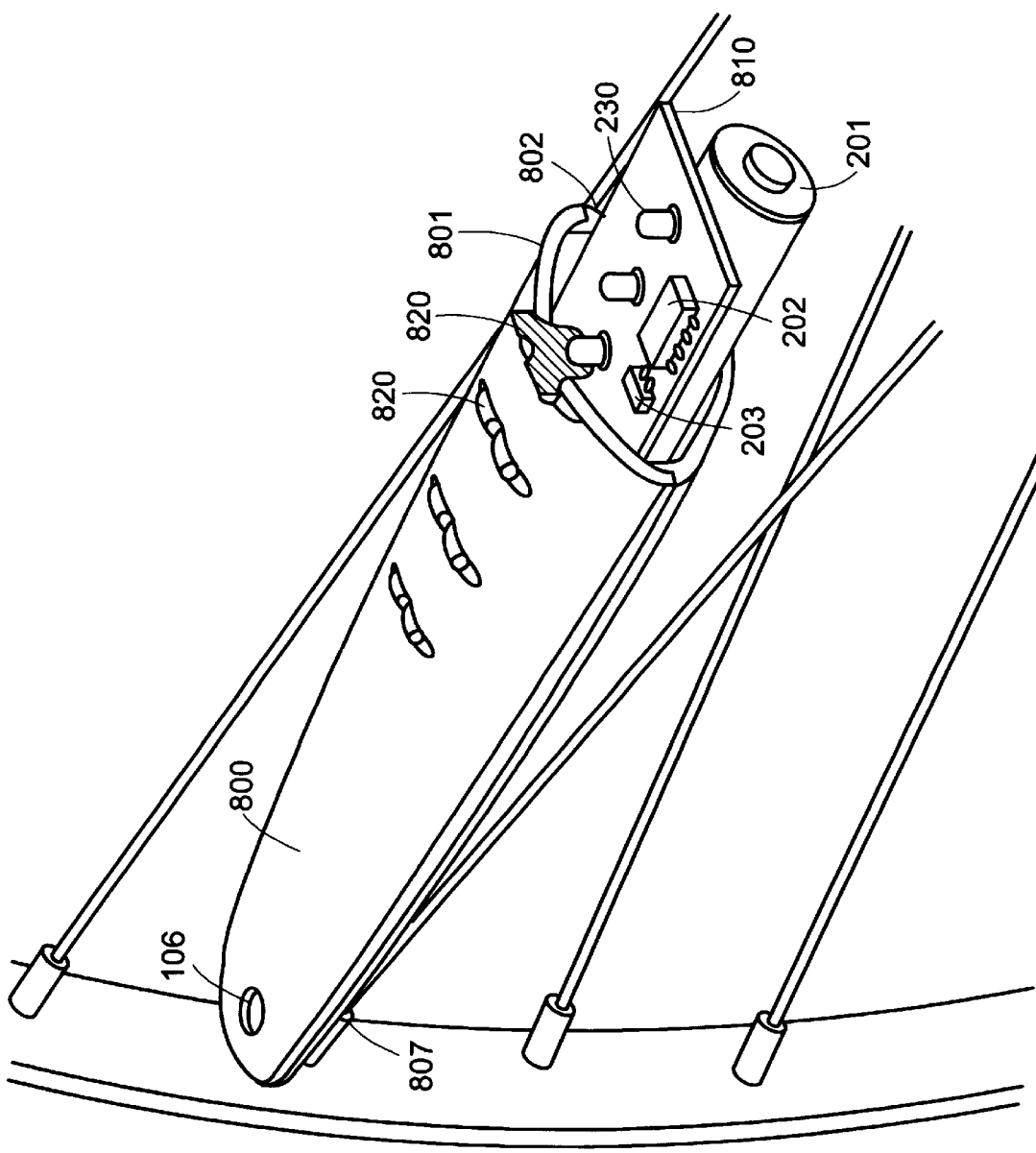
FIG. 8 is a partially cut-away view of a master array.
Figure 9:
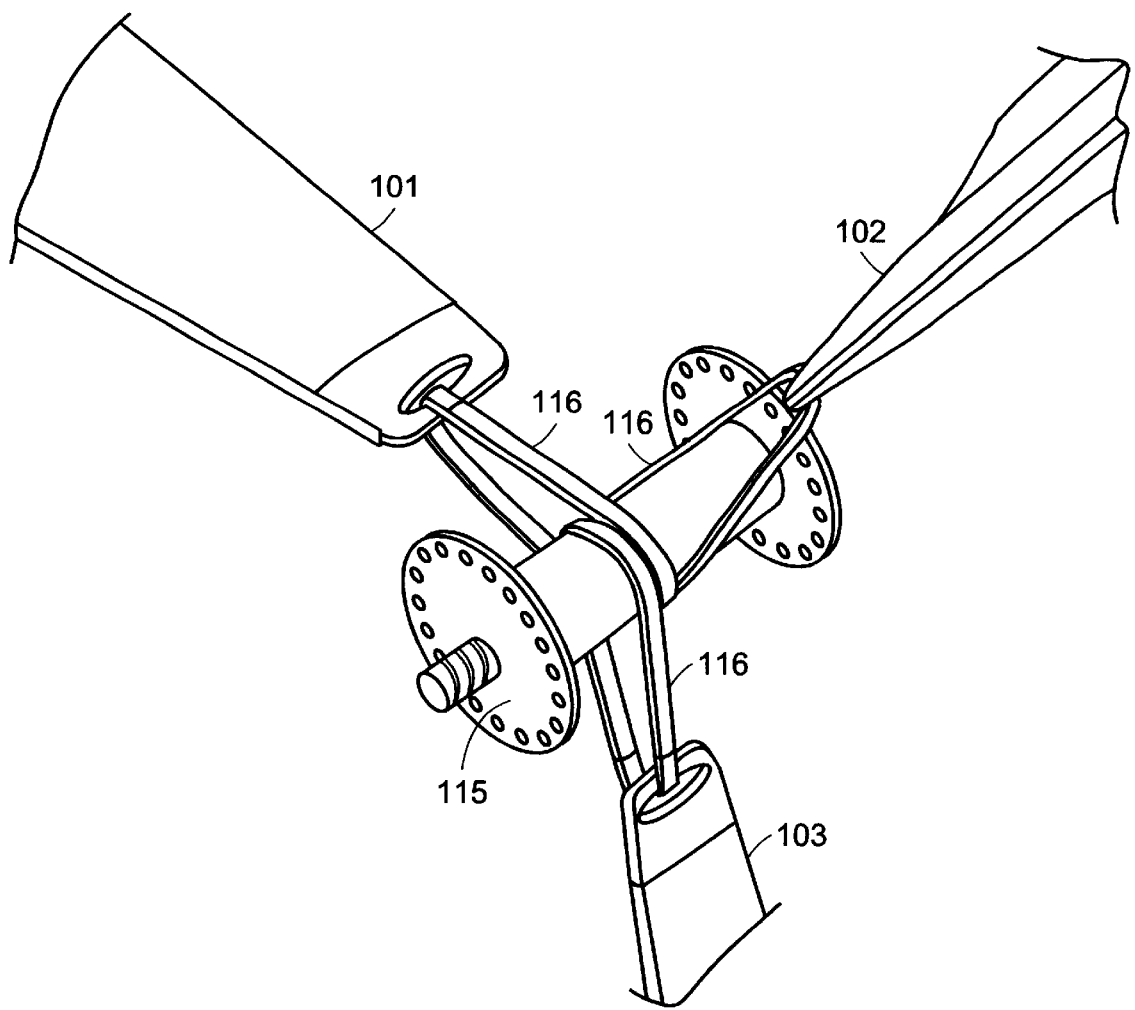
FIG. 9 is shows arrays attached to a wheel hub.

As shown, in FIG. 8, each display device is mounted in a propeller shaped housing 800 having top and bottom part 801-802. The components, for example, the LEDs 230, microprocessor 202 and clock 203 are mounted on a circuit board 810. The batteries 201 are mounted between the circuit board and the bottom part of the housing. The housing includes cut-outs for a series of light-pipes 820 that split the light path from the single LEDs into two light paths, each perpendicular the rotation of the wheel. The display device is attached to a spoke near the rim by a clip 807 located on the bottom part opposite the sensor 106 in the top part. As shown in FIG. 9, the other end of the display devices 101–103 can be attached to the hub 115 of the wheel by is elastic straps 116.

Although the embodiments shown are for mounting on a bicycle, it should be understood that the apparatus can also be mounted on automobile wheels, ceiling fans, wiper blades, airplane propellers, or other rotating or oscillating objects.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

I claim:

1. A light display apparatus for mounting on a wheel attached to a fixed frame, comprising:

an elongated housing having two ends and including a single master array of lights, the elongated housing radially mounted on the wheel such that one end of the elongated housing is proximate a hub of the wheel and another end is proximate a rim of the wheel;

a sensor mounted on the elongated housing for sensing a velocity of the wheel with respect to the fixed frame, the sensor is attached to a single induction wire coil;

a magnet is mounted on the fixed frame; and a microprocessor, mounted on the elongated housing and connected to the master array of lights and the sensor, including a memory storing a plurality of display patterns, the microprocessor modulating the master array of lights according to a selected one of the plurality of display patterns and the sensed velocity of the wheel to form an image using persistence of vision of a viewer.

2. The apparatus of claim 1 wherein the fixed frame is a bicycle, and the wheel has an angular velocity, and the one end of the elongated housing is directly attached to the hub of the wheel.

3. The apparatus of claim 1 further including means for attaching the elongated housing to a single spoke of the wheel.

4. The apparatus of claim 1 further including a plurality of elongated slave housings, each elongated slave housing having two ends, each elongated slave housing including a slave array of lights, each elongated slave housing individually and radially mounted on the wheel such that one end of each elongated slave housing is proximate the hub of the wheel and another end is proximate the rim of the wheel, each slave array of lights individually connected to the microprocessor and modulated according to the selected one of the plurality of display patterns and the sensed velocity.

5. The apparatus of claim 4 further including pull-down resister means for determining the number of slave arrays of lights.

6. The apparatus of claim 4 further including means for distributing and sharing power among the master and slave arrays of lights wherein the housing and each slave housing includes a power supply.

7. The apparatus of claims 4 further including means for unique identifying each of the plurality of slave arrays of lights.

8. The apparatus of claim 4 wherein the master and slave arrays of lights are spaced equally apart.

9. The apparatus of claim 4 wherein the master and slave arrays of lights are spaced unequally apart, and further including means for adjusting the modulation of the master and slave array of lights according to the unequal spacing of the master and slave arrays to form a continuous single image using persistence of vision of a viewer.

10. The apparatus of claim 1 wherein a serial signal for modulating the array of lights is converted to a parallel signal by a series to parallel converter between the microprocessor and the array of lights.

11. The apparatus of claim 1 wherein the sensor is a solid-state magnetic-field Hall-effect integrated circuit.

12. The apparatus of claim 1 wherein batteries for operating the master array of lights and the microprocessor are mounted in the housing.

13. The apparatus of claim 1 further including control buttons for selecting one of the plurality of display patterns.

14. The apparatus of claim 1 including means for splitting light emitted by the array of lights into exactly two opposing directions.

15. A light display apparatus for mounting on a hub of a wheel, comprising:

propeller-shaped elongated housing having one end connected to the hub, the propeller-shaped elongated housing including a plurality of arrays of lights;

a single inductive magnetic coil sensor for sensing an angular velocity of the wheel; and a microprocessor connected to each of the arrays of light and the inductive magnetic coil sensor for modulating the arrays of lights according to a selected one of a plurality of display patterns and the sensed angular velocity of the wheel.

\* \* \* \* \*